(12) United States Patent
Brabenac

(10) Patent No.: US 6,418,124 B2
(45) Date of Patent: *Jul. 9, 2002

(54) METHOD AND APPARATUS FOR ROUTING A PACKET IN A NETWORK

(75) Inventor: Charles L. Brabenac, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,017

(22) Filed: Nov. 5, 1997

(51) Int. Cl.$^7$ ............................................... H04L 12/56
(52) U.S. Cl. ........................................ 370/257; 370/475
(58) Field of Search ................................. 370/389, 392, 370/400, 410, 474, 475, 401, 402, 403, 404, 408, 409, 471, 395.54, 395.52, 257; 709/227, 237, 238, 245

(56) References Cited

U.S. PATENT DOCUMENTS

| | | | | |
|---|---|---|---|---|
| 5,742,833 A | * | 4/1998 | Dea et al. ................... | 713/313 |
| 5,802,305 A | * | 9/1998 | McKaughan et al. ........ | 709/227 |
| 5,907,546 A | * | 5/1999 | Henriksson et al. ......... | 370/349 |
| 5,917,825 A | * | 6/1999 | Cohen ......................... | 370/401 |
| 5,959,974 A | * | 9/1999 | Badt et al. ................... | 370/233 |
| 6,002,675 A | * | 12/1999 | Ben-Michael et al. ...... | 370/315 |
| 6,047,378 A | * | 4/2000 | Garrett ......................... | 713/300 |
| 6,049,825 A | * | 4/2000 | Yamamoto ................... | 709/221 |
| 6,052,372 A | * | 4/2000 | Gittins et al. ................ | 370/396 |

* cited by examiner

Primary Examiner—Melvin Marcelo
Assistant Examiner—Soon-Dong Hyun
(74) Attorney, Agent, or Firm—Blakely, Sokoloff, Taylor & Zafman LLP

(57) ABSTRACT

A method to route a packet in a computer network in which the packet is transmitted via a router to a destination that is in a sleep state. The data packet causes a router to broadcast an address resolution request which in response awakens the destination from its sleep state. Upon awakening, the destination provokes a resolution of a destination address in which the address resolution is provoked without waiting for a reception of another address resolution request. When a second data packet is transmitted to the destination address, the destination address resolution is already resolved.

34 Claims, 5 Drawing Sheets

METHOD AND APPARATUS FOR ROUTING A PACKET IN A NETWORK

BACKGROUND OF THE INVENTION

1. Field of the Invention

This invention relates generally to computer networks and, more particularly, to a method and apparatus for routing a packet in a computer network.

2. Description of the Related Art

Local area networks ("LANs") are now commonplace. A LAN is a computer network that spans a relatively small area. Most LANs connect workstations and/or personal computers in a way that enables a user to access data and devices at any of the locations on the LAN so that many users can share expensive types of devices such as laser printers and can share information.

There are many types of LANs. Common examples include token ring networks and Ethernets. A token ring network is a type of computer network in which the computers are schematically arranged in a circle. A packet of digital information, called a "token," travels around the circle. To send a message, a computer attaches its message to the token and lets the token continue traveling around the network. Each computer checks the message when it receives a token to see if it is the intended destination and, if so, removes the message from the token. An Ethernet is a bus network in which packets of digital information travel up and down the bus. Although these are the most common type of LANs, there are still others, such as ARCnet, in use.

FIG. 1 depicts a prior art computer network 10 that will be used to illustrate several concepts associated with the invention. The computer network 10 generally comprises a first LAN 12, a second LAN 14, and a router 15. A "router" is a device that connects two or more LANs as shown in FIG. 1 and in a manner described more fully below. The first LAN 12 includes a server 16 and two workstations 18. The second LAN 14 similarly includes a second server 20 and two workstations 22. Each of the router 15, the server 16, the workstations 18, the server 20, and the workstations 22 may be generally referred to as a "LAN device." The various components of the computer network 10 are interconnected by communication links 23, 24, and 25, which may be any type of media such as twisted pair wires, coaxial cables, fiber optic cables, or some combination thereof. Some LANs even use wireless communications links, such as radio or infrared waves.

The workstations 18 and workstations 22 can send messages to one another through the network 10 in "packets" of digital information. Each device on the network 10 is assigned a physical address. Each packet contains a destination address for one of the other workstations and message data. Thus, for one workstation 18 to communicate with the other workstation 18, the first workstation 18 composes a packet which is then electronically transmitted to the other workstation 18 over the LAN 12 through the communications links 24. The workstations 22 use this same process. However, for a workstation 18 to transmit a message to a workstation 22, the workstation 18 must compose a data packet that is transmitted via the router 15.

The manner in which the LAN devices communicate is determined by a "protocol." A protocol is an agreed upon format for transmitting data between and among devices. Thus, the network's protocol determines the composition, transmission, receipt, and decomposition of the packets. Most networks use some form of the transport control protocol/Internet protocol ("TCP/IP"). The TCP/IP protocol is actually a group of protocols. Note that, although the term "Internet" appears in the name of the protocol, its application is not limited to the Internet, other wide area networks ("WANs"), or any other type of network.

The TCP/IP protocols are typically used to implement computer networks, such as the computer network 10, dictate that the destination address for any individual packet have at least two parts. One part of the address is very general and one part of the address is very specific. The general part of the address is known as the Internet protocol ("IP") address and determines whether the packet is sent to its destination through the router 15. The router 15 then determines, or "resolves," the specific physical address of the packet's destination from the IP address carried by the packet. Thus, the IP address is not an actual physical address, but instead merely represents a physical address.

When the router 15 receives a packet, it determines whether it knows the physical address represented by the IP address. The router 15 temporarily stores physical addresses to which it has recently transmitted, and checks this store whenever it receives a packet. If the physical address of the received packet can be determined from the stored information, the router 15 transmits the packet right away. If not, then the router 15 must "resolve" the physical address. The router 15 typically does this using what is known as an "address resolution protocol" ("ARP").

The ARP is part of the TCP/IP protocol suite and is used to convert an IP address into the physical address that is the destination of the packet. The ARP requires the router 15 to broadcast to all LAN devices on the network 10 what is known as an ARP request. The ARP request instructs the LAN device corresponding to the IP address to respond by transmitting its physical address back to the router 15. The intended destination then replies to the request with its physical hardware address. The router 15 receives the physical address and stores it temporarily.

During the ARP, the router 15 either retains or discards the packet for which the ARP is issued. If the packet is retained, the router 15 simply transmits it to whichever LAN device responded to the ARP request. However, some routers do not retain the packet during ARP and the packet is lost. The LAN devices are typically programmed for this eventuality such that they will send the packet to the router 15 several times. Thus, the router 15 might receive the packet two or three times while transmitting the packet to the destination only on the second or third try.

For example, assume that a workstation 18 transmits a data packet to a workstation 22 over the network 10 and that the router 15 does not retain the data packet. The workstation 18 transmits the data packet over the LAN 12 to the router 15. The router 15 then broadcasts an ARP request and the workstation 22 replies to the request by sending its physical address to the router 15. In the meantime, the router 15 has dropped the data packet. The router 15 then receives the physical address of the workstation 22 over the LAN 14 and temporarily stores it. The workstation 18 once again sends the data packet to the router 15. The router 15 then checks its memory, finds the previously resolved physical address of the workstation 22, and forwards the data packet to the workstation 22. Although such a network obviously lacks something in efficiency, this protocol simplifies the design and reduces the cost of implementing the network 10 overall.

This procedure works reasonably well unless one or more of the LAN devices on the network 10 includes a power management feature that inactivates the LAN device when not in use. If, for instance, a workstation 22 incorporates a power management system, the operating system of the workstation 22 will switch to a "sleep" state to reduce power consumption after a predetermined period of inactivity. When the router 15 broadcasts an ARP request to which a sleeping workstation 22 should respond, the workstation 22 has to "wake up" before responding.

The presence of power-managed devices is important because of the way they typically implement their retention capabilities. LAN devices such as the servers 16 and 20 and the workstations 18 and 22 typically have a retention capability. However, the retention capability for some devices deactivates when the device goes to sleep. Thus, in the context of ARP, the LAN device when it is asleep may retain the ARP request or discard it depending on its retention capabilities. The sleep-state retention capability for LAN devices is expensive to implement and was previously thought to be non-critical. Many computer networks such as the network 10 are therefore implemented with LAN devices omitting a sleep-state retention capability for cost reasons. However, recent information indicates that sleep-state retention capability is extremely critical in some implementations to prevent LAN connection failures and lost information Assume again the previous scenario, except that (1) the destination workstation 22 is a power-managed device, (2) the workstation 22 lacks a sleep-state retention capability, and (3) the workstation 22 is asleep at the time the data packet is first transmitted. The first ARP request awakens the workstation 22. While the workstation 22 is awakening, the source workstation 18 may re-send one or more data packets with the router 15 broadcasting another ARP request for each data packet, again dropping the data packets. The destination workstation 22 in this scenario cannot respond to the first ARP request upon awakening because it has not been retained. Once the destination workstation 22 is awakened, it can respond to one of the subsequent ARP requests so that the router 15 can resolve its physical address. However, in some circumstances, by the time the physical address of the workstation 22 is finally resolved, the source workstation 18 has quit re-sending the packet. Thus, although the router 15 has now resolved and stored the address and the destination workstation 22 is awake, the connection has failed and the information is lost.

The present invention is directed to overcoming, or at least reducing the effects of, one or more of the problems set forth above.

SUMMARY OF THE INVENTION

The invention in one embodiment is a method for routing a packet in a network. The method includes transmitting a first data packet to a destination; provoking resolution of the destination address of the first data packet; and transmitting a second data packet to the destination after the destination address is resolved.

BRIEF DESCRIPTION OF THE DRAWINGS

Other objects and advantages of the invention will become apparent upon reading the following detailed description and upon reference to the drawings in which.

Figure 1:
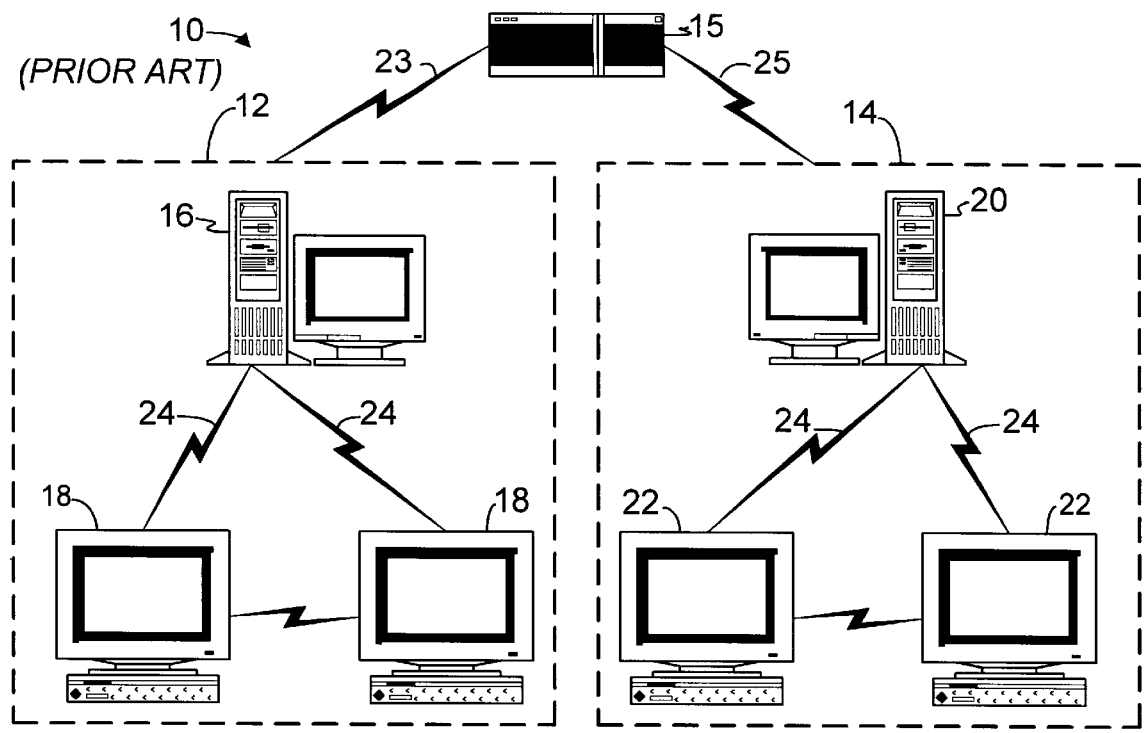
FIG. 1 conceptually illustrates a computer network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2:
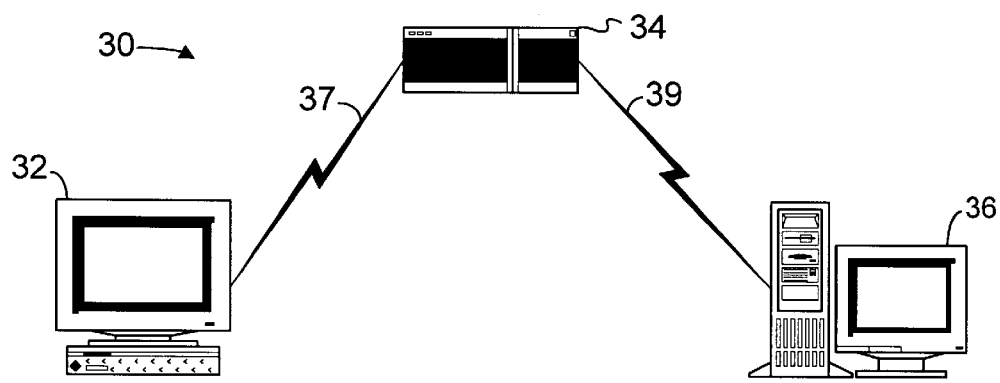
FIG. 2 conceptually illustrates a network operating in accord with the present invention in one embodiment.

FIG. 2 illustrates a computer network 30 constructed and operating in accordance with one embodiment of the invention. The network 30 generally comprises a source 32, a router 34, and a destination 36, all joined by communication links 37 and 39. In the embodiment illustrated, the source 32 is a workstation and the destination 36 is a server. However, the invention is not so limited as both the source 32 and the destination 36 may be any kind of LAN device known to the art. Also, it is possible that, in some embodiments, source 32 might comprise two separate devices operating in tandem. The router 34 in the embodiment illustrated omits the capability to retain a packet during address resolution, but the invention is not so limited. The router 34 may, in some embodiments, include such a retention capability. The destination 36 in the embodiment illustrated is a power managed device. However, again the invention is not so limited as the destination 36 may be any type of LAN device known to the art.

Figure 3:
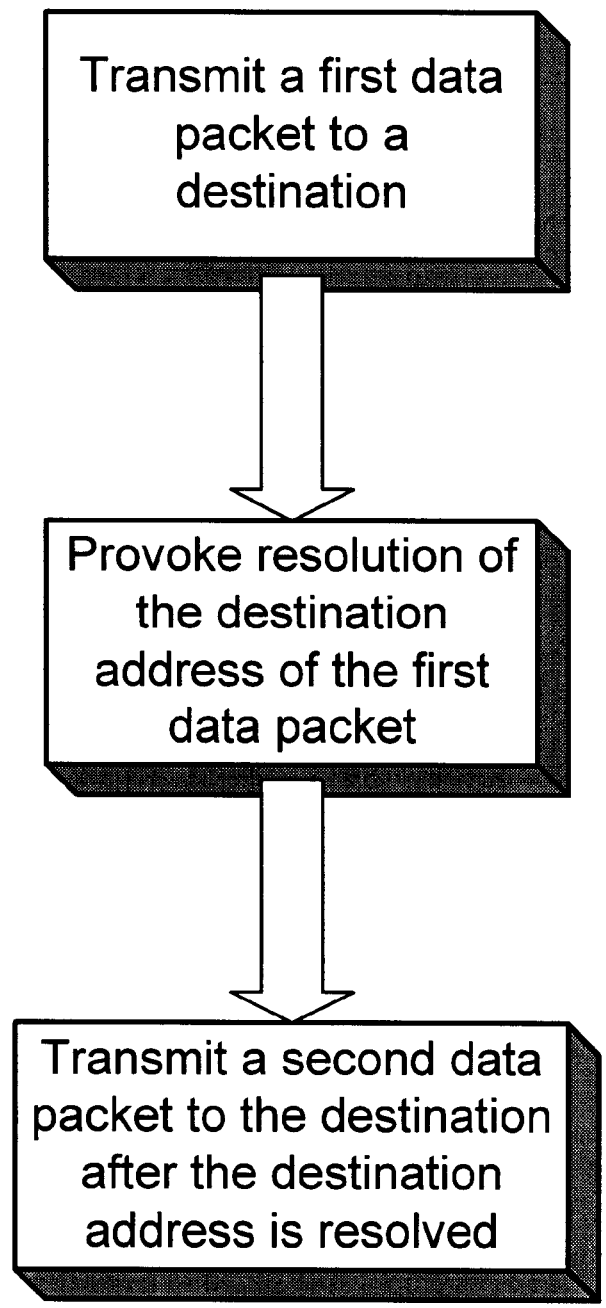
FIG. 3 conceptually illustrates one embodiment of a method in accordance with the present invention.

In accordance with the method conceptually illustrated in FIG. 3, the source 32 transmits a first data packet to the destination 36 via the router 34. The router 34, upon receiving the first data packet, broadcasts the ARP request over the subnet, or LAN, including the destination 36. Because the router 34 in the embodiment illustrated does not have the capability for retaining the packet, the packet is dropped.

The destination 36 receives the ARP request. Because, in the embodiment illustrated, the destination 36 is a power managed device that may be in a sleep state, the destination 36 may need to first awaken before being able to reply to the ARP request. Furthermore, because the destination 36 in the embodiment illustrated lacks the capability of retaining the ARP request while awakening, the destination 36 will drop the ARP request and fail to reply if it is in a sleep state. The destination 36 then, in accordance with the present invention, provokes resolution the destination address upon awakening. Note that this provocation is distinguishable from replying to the ARP request in the typical address resolution protocol.

The address resolution may be provoked by transmitting a "provoking" packet from the destination 36 to the router 34 once the destination 36 has awakened. The provoking packet can be any type of packet that may be transmitted over the subnet or LAN including the destination 36 and the router 34 to which the router 34 will respond. Examples include an Internet Control Message Protocol ("ICMP") echo request sent out to the IP multi-cast address 224.0.0.2 (ie., all routers on the subnet), and an ARP request for the IP address known to belong to the router 34 in use. However, other types of packets may be used to provoke the address resolution and the type of packet may depend on the particular embodiment of the invention being implemented.

The source 32 then transmits a second data packet to the destination 36. The first and second data packets may preferably be identical but may, in some alternative embodiments, be different. Also, in some embodiments, the source 32 may have unsuccessfully attempted to transmit other data packets to the destination 36 between the first and second data packets as a result of programmed retries as described above. The address included in the second data packet has previously been resolved as a result of the destination 36's provocation and is stored in the memory of the router 34 such that the router 34 need not reissue the ARP request. The router 34 consequently directly routes the second data packet to the destination 36.

Thus, the source 32 sequentially transmits a first data packet and a second data packet to the destination 36 via the router 34. The router 34 resolves the address of the first data packet upon the provocation of the destination 36. The destination 36 provokes the resolution upon awakening from a sleep state responsive to the ARP request broadcast by the router 34 for the first data packet. The router 34 then routes the second data packet to the destination 36 upon its receipt. The period of time between the transmission of the first and second data packets by the source 32 will vary depending upon the particular embodiment implemented, as will be recognized by those in the art having the benefit of this disclosure. The factors in this determination are well known in the art, and will include, for instance, the estimated round trip time.

Figure 4A:
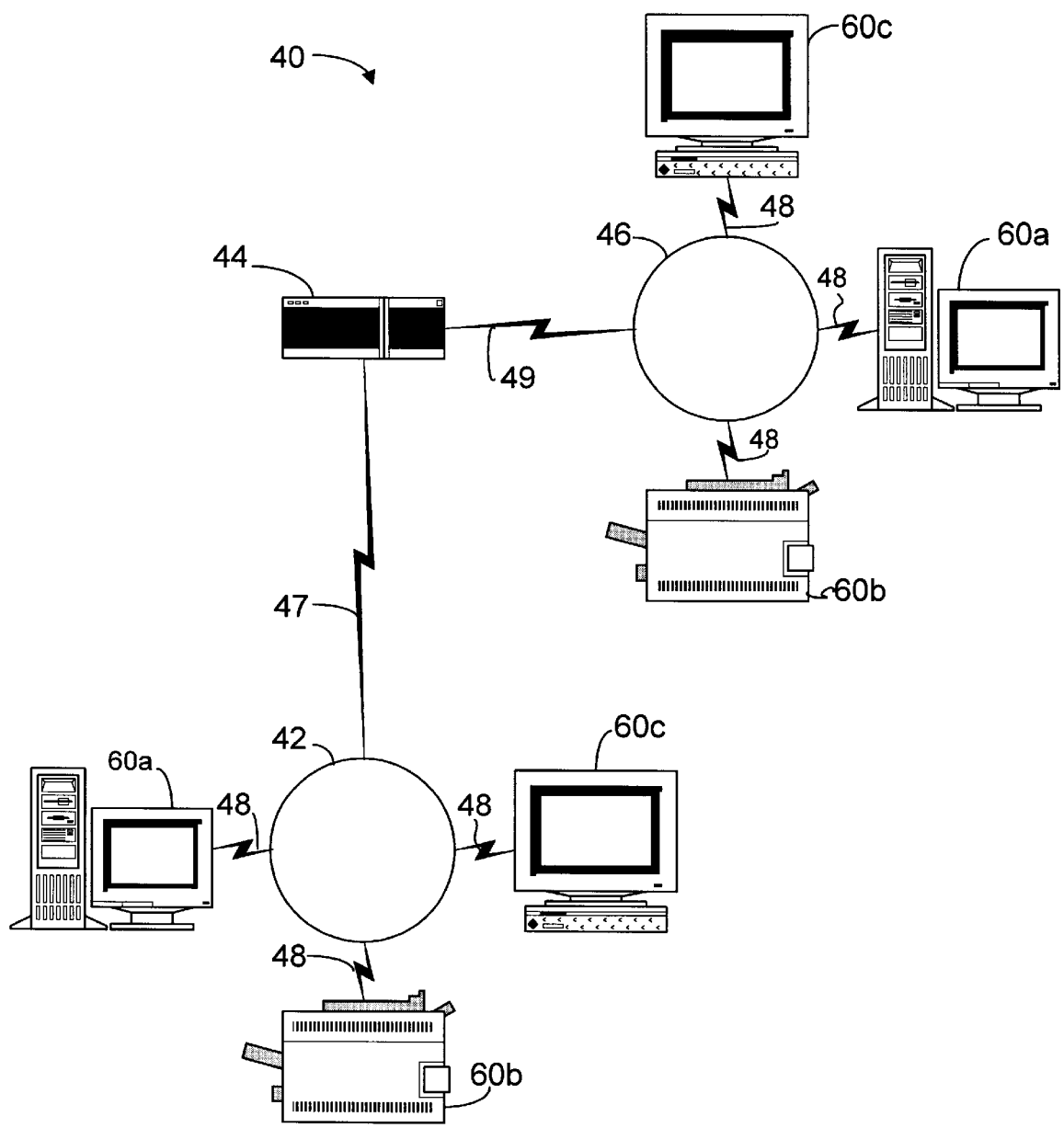
FIGS. 4A and 4B illustrate alternative computer networks with which the invention may be implemented in alternative embodiments.
Figure 4B:
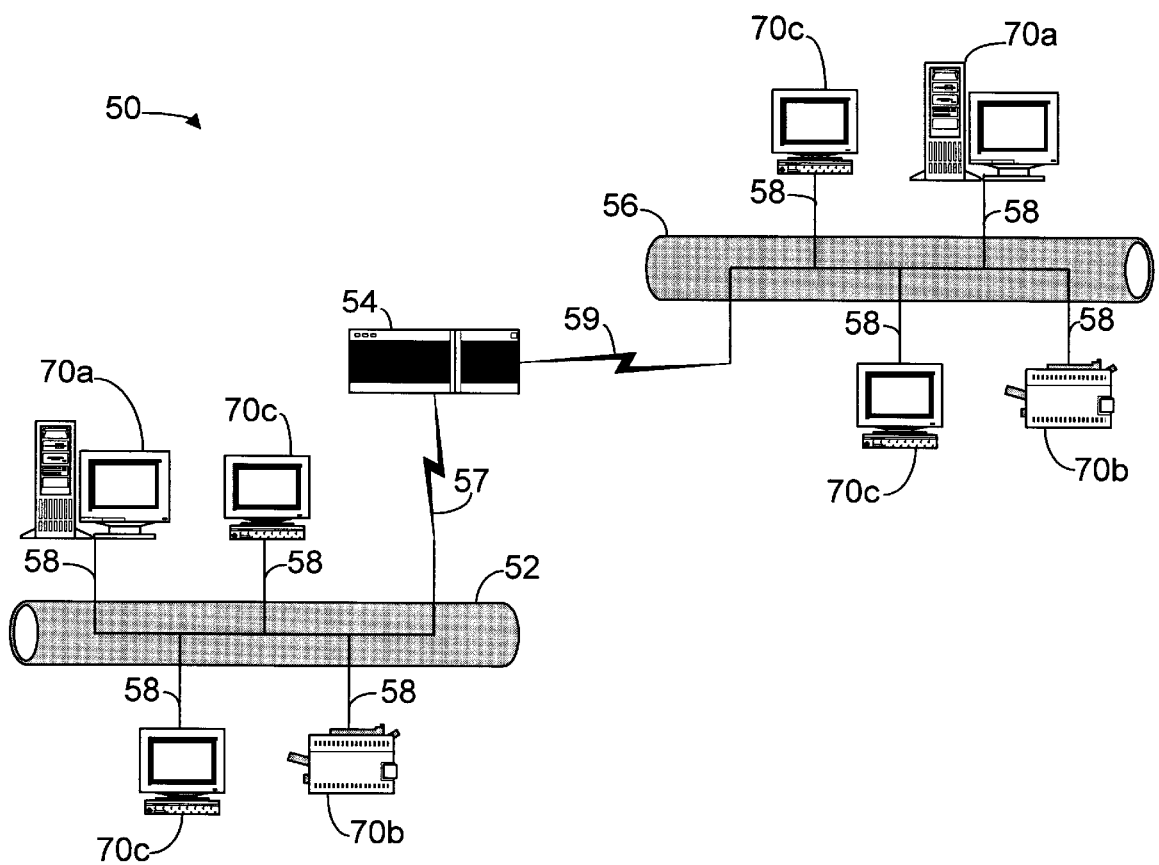

FIGS. 4A and 4B illustrate two alternative embodiments of the invention. The embodiment of FIG. 4A is a network 40 comprising a first LAN 42, a router 44, and a second LAN 46, all joined by communication links 47, 48, and 49. Both the first LAN 42 and the second LAN 46 are token ring networks as are known in the art and are discussed above, as modified to implement the present invention. The embodiment of FIG. 4B is a computer network 50 comprising a first LAN 52, a router 54, and a second LAN 56, all joined by communications links 57, 58, and 59. In this embodiment, both the first LAN 52 and the second LAN 56 are Ethernet networks as are known in the art and are discussed above, as modified to implement the present invention. Both the network 40 of FIG. 4A and the network 50 of FIG. 4B may be implemented using the alternative method of FIG. 5.

Figure 5:
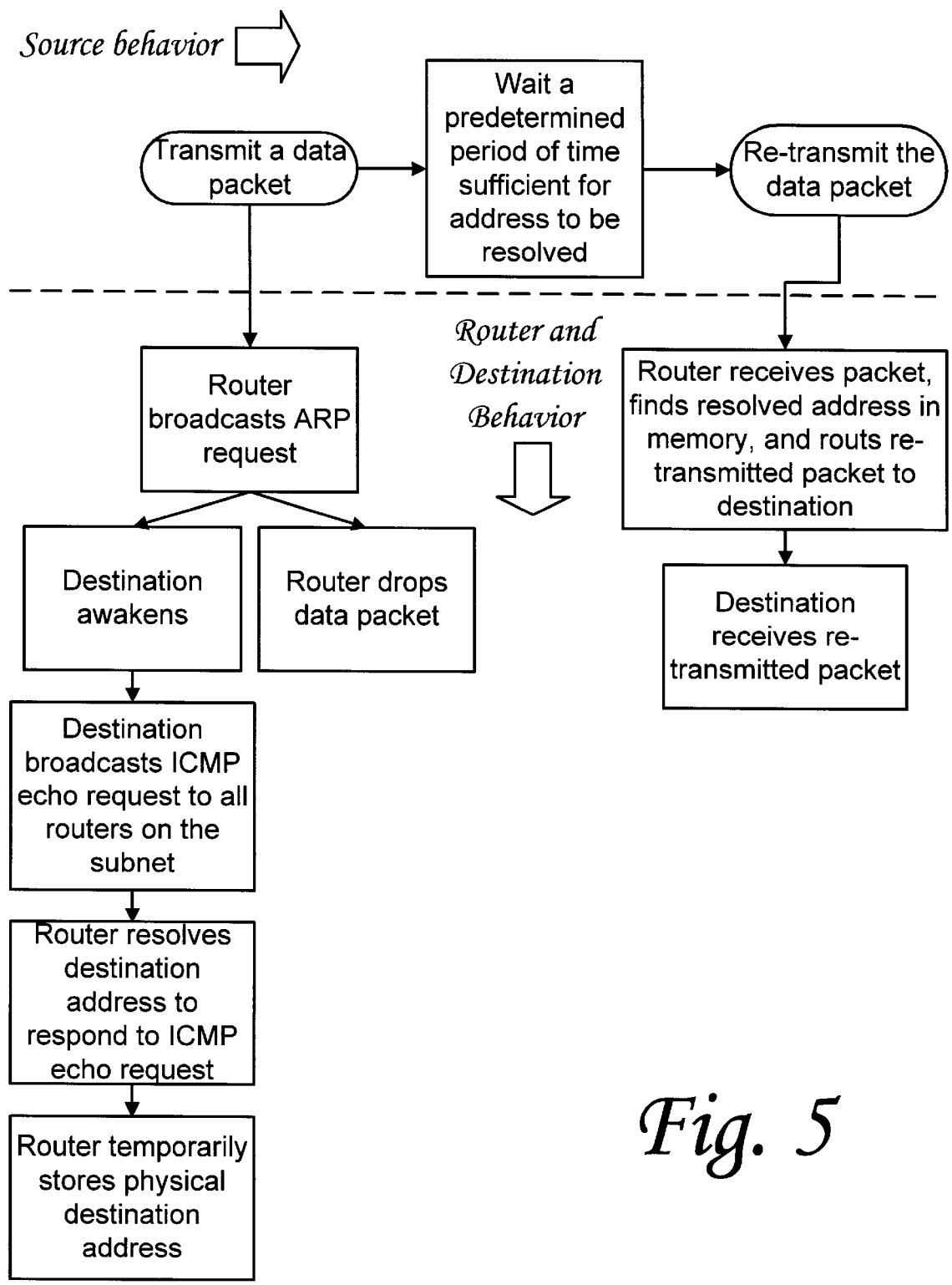
FIG. 5 conceptually illustrates an alternative embodiment of a method for implementing the present invention on the computer networks of FIGS. 4A and 4B.

Turning now to FIGS. 4A and 5, each of the first LAN 42 and the second LAN 46 comprise a plurality of LAN devices. Each of the first LAN 42 and the second LAN 46 includes a server 60a, a printer 60b, and a workstation 60c. Again, these are exemplary LAN devices and may in other embodiments be other types of LAN devices. The pieces of the network 40 are connected by communications links 47, 48, and 49, which may be any suitable type of communications links known to the art.

The source 60c of the first LAN 42 transmits a data packet to the destination 60a, which is asleep, of the second LAN 46 via the router 44 using a TCP/IP protocol. The router 44 receives the data packet, broadcasts an ARP request throughout the network 40, drops the data packet, and waits for the reply to the ARP request. The destination 60a receives the ARP request and awakens. The destination 60a then provokes the resolution of its physical address by broadcasting an ICMP echo request to the IP address 224.0.0.2. The router 44 then resolves the physical address of the destination 60a in memory. After waiting a predetermined period of time sufficient for the address resolution to finish, the source 60c then re-transmits the data packet. Because the address of the destination 60a has been resolved, the router 44 transmits the data packet to the destination 60a without issuing another ARP request.

Thus, it can be seen that the present invention is well-suited for its intended purpose. In particular, the present invention minimizes LAN connection problems and latencies in computer networking environments where power-managed LAN devices are accessed through a router without having to replace or re-program the router. However, the present invention may also be employed advantageously in other computer networking environments to achieve higher performance in making LAN connections. Furthermore, the invention may be implemented solely in the software of power-managed LAN devices, thereby eliminating expensive equipment changes in established computer networks.

The particular embodiments disclosed above are illustrative only as the invention may be modified and practiced in different but equivalent manners apparent to those skilled in the art having the benefit of the teachings herein. For instance, although the embodiments of FIGS. 4A and 4B employ a router joining LANs employing the same topology and protocol, the router may join LANs employing alternative topologies and protocols. The network 50 of FIG. 4B may, like the network 40 of FIG. 4A, be implemented using the method of FIG. 5. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method comprising:
   transmitting a first data packet via a router to a destination which is in a sleep state, wherein said destination does not have sleep state retention capability;
   broadcasting an address resolution request from the router which in response awakens the destination from the sleep state;
   provoking a resolution of a destination address upon awakening from the sleep state and without waiting for a reception of another address resolution request; and
   transmitting a second data packet to the destination which has its destination address resolved.

2. The method of claim 1, wherein the data packets are transmitted from a same source.

3. The method of claim 1, wherein the resolved address is retained in a storage medium.

4. The method of claim 1, wherein the provoking the resolution is achieved by transmitting from the destination to the router an ICMP echo request or an ARP request for an IP address of the router.

5. The method of claim 1, wherein at least one of the data packets is transmitted using a TCP/IP protocol.

6. The method of claim 1, wherein the second data packet is a repeat of the first data packet.

7. The method of claim 1, wherein the first data packet is not retained once reaching the router.

8. The method of claim 1, wherein the destination does not retain the address resolution request once received.

9. The method of claim 1, wherein the second data packet is transmitted after a predetermined period of time after the first data packet is transmitted to ensure that sufficient time has lapsed for the destination address to be resolved.

10. An apparatus comprising:
    a source to transmit a first data packet and subsequently a second data packet;
    a router to broadcast an address resolution request upon receiving the first data packet; and
    a destination which does not have sleep state retention capability and which is in a sleep state, to awaken in response to the address resolution request, to provoke a resolution of a destination address without waiting for a reception of another address resolution request and to receive the second data packet upon resolution of the destination address.

11. The apparatus of claim 10, wherein said source is a LAN device.

12. The apparatus of claim 10, wherein said router stores the resolved destination address.

13. The apparatus of claim 10, wherein said destination provokes the resolution by transmitting an ICMP echo request or an ARP request for an IP address of said router.

14. The apparatus of claim 10, wherein at least one of the data packets are transmitted using a TCP/IP protocol.

15. The apparatus of claim 10, wherein said destination is a power-managed device in which the sleep state is one of a power-managed states.

16. The apparatus of claim 10, wherein said source is a server or a workstation.

17. The apparatus of claim 10, wherein said destination does not retain the address resolution request.

18. The apparatus of claim 10, wherein said router does not retain the first data packet once it reaches said router.

19. An apparatus for routing a packet in a computer network comprising:
    a source to sequentially transmit a first data packet and a second data packet, the packets including a destination address;
    a router to resolve the destination address upon receipt of the first data packet by broadcast of an address resolution request; and
    a destination which does not have sleep state retention capability and which is in a sleep state, to awaken in response to the address resolution request, to provoke a resolution of the destination address without waiting for a reception of another address resolution request and to receive the second data packet upon resolution of the destination address.

20. The apparatus of claim 19, wherein said source is a LAN device.

21. The apparatus of claim 19, wherein said router stores the resolved destination address.

22. The apparatus of claim 19, wherein said destination is capable of provoking resolution by transmitting an ICMP echo request or an ARP request for an IP address of said router.

23. The apparatus of claim 19, wherein at least one of the data packets can be transmitted using a TCP/IP protocol.

24. The apparatus of claim 19, wherein said destination is a power-managed device in which the sleep state is one of a power-managed states.

25. The apparatus of claim 19, wherein said source is a server or a workstation.

26. The apparatus of claim 19, wherein said destination does not retain the address resolution request.

27. The apparatus of claim 19, wherein said router does not retain the first data packet once it reaches said router.

28. A method to route a packet in a computer network comprising:
    transmitting a data packet via a router to a destination which is in a sleep state, wherein said destination does not have sleep state retention capability;
    broadcasting an address resolution request from the router which in response awakens the destination from its sleep state;
    provoking a resolution of a destination address upon awakening from the sleep state and without waiting for a reception of another address resolution request; and
    re-transmitting the data packet to the destination address which has its destination resolved.

29. The method of claim 28, wherein the data packets are transmitted and re-transmitted from a same source.

30. The method of claim 28, wherein the resolved physical address is retained in a storage medium.

31. The method of claim 28, wherein the provoking the resolution is achieved by broadcasting from the destination to the router an ICMP echo request or an ARP request for an IP address of the router.

32. The method of claim 28, wherein the data packets are transmitted and re-transmitted using a TCP/IP protocol.

33. The method of claim 28, wherein the transmitted data packet is discarded once reaching the router.

34. The method of claim 28, wherein the data packet is re-transmitted after a predetermined period of time after the first transmission.

* * * * *